United States Patent [19]

Down et al.

[11] 4,379,855
[45] Apr. 12, 1983

[54] METHOD OF ION EXCHANGE REGENERATION

[75] Inventors: Peter E. Down, Summit; Walter J. Tomlinson, Jr., Harrington Park, both of N.J.

[73] Assignee: Ecodyne Corporation, Chicago, Ill.

[21] Appl. No.: 279,525

[22] Filed: Jul. 1, 1981

[51] Int. Cl.³ .............................................. B01J 49/00
[52] U.S. Cl. ....................................... 521/26; 210/677
[58] Field of Search ................... 210/677, 678; 521/26

[56] References Cited

U.S. PATENT DOCUMENTS 3,240,699  3/1966  Duff et al. .......................... 210/678
3,531,401  9/1970  Crits ..................................... 210/677
3,617,558  11/1971  Jones ................................... 210/677
3,655,587  4/1972  Bouchard et al. .................. 210/678
3,711,401  1/1973  Hamilton et al. ................... 210/677

Primary Examiner—Ivars C. Cintins
Attorney, Agent, or Firm—Dressler, Goldsmith, Shore, Sutker & Milnamow, Ltd.

[57] ABSTRACT

A stratified bed of ion exchange resins is regenerated by countercurrent or upflow regeneration. Expansion of the bed is prevented by returning used regenerant solution to the top of the bed and pumping the returned regenerant solution downwardly through the layer of resin at the top of the bed. Recycling of the used regenerant solution also regenerates the upper layer of resin.

11 Claims, 1 Drawing Figure

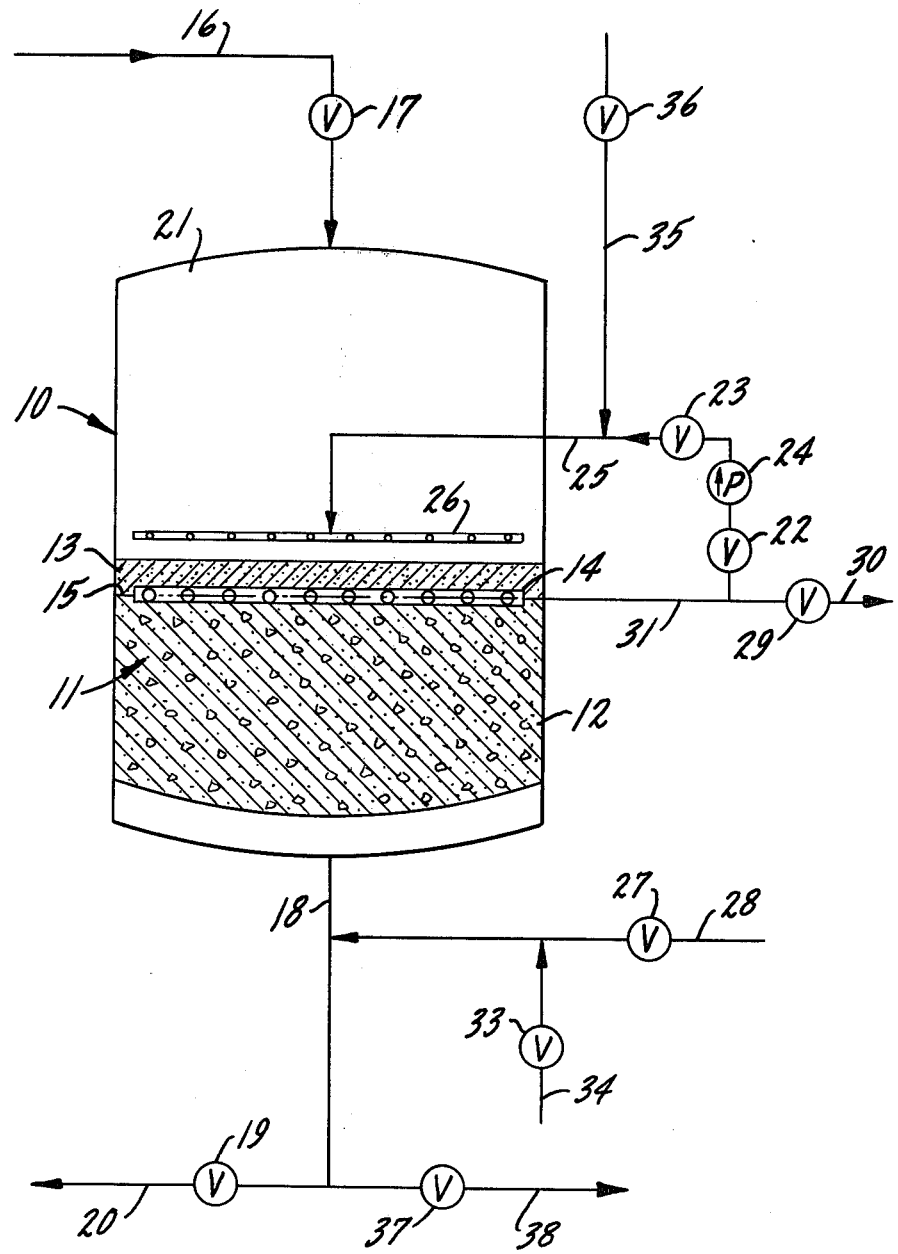

METHOD OF ION EXCHANGE REGENERATION

BACKGROUND OF THE INVENTION

This invention relates to the treatment of liquids and more particularly to improved methods of upflow regeneration of ion exchange resins.

Ion exchange resins used to remove unwanted ions from liquids eventually become exhausted or spent and must have their liquid treating properties restored by regenerating them with chemical solutions that replace the unwanted ions with exchangeable ions. When liquid is treated by flowing it downwardly through a bed of ion exchange resin particles, it is often advantageous to regenerate the particles by flowing the regenerant solution upwardly in the opposite direction through the bed. This contacts the cleanest, least exhausted resin particles at the bottom of the bed with full strength regenerant solution. Such full strength solution more completely regenerates the particles at the bottom of the bed and thus produces a relatively efficient scrubber zone for polishing the liquid as it leaves the bed by removing ions at relatively low concentrations. The partially spent regenerant solution passing through the resin particles at the upper part of the bed still has enough strength to remove unwanted ions therefrom, and this increases the regenerating efficiency of the regenerant solution. However, the upwardly flowing regenerant solution tends to expand and upset the resin bed; this lowers regeneration efficiency which is highest when the bed is in a compact state and the resin particles are in contact with each other. Also, during upflow regeneration, channeling of the regenerant flow can cause regenerant to short circuit portions of the bed; this can prevent complete or efficient regeneration of the bed.

Prior attempts that have been made to prevent expansion of an upwardly regenerated resin bed have had serious disadvantages. The use of air pressure to block bed expansion requires expensive air compressors and controls, and also a six inch layer of inert material on top of the resin bed. Downwardly flowing raw water has been used to block upward bed expansion, but this results in a large volume of waste liquid that must be neutralized before it can be disposed of. And precipitation of calcium sulfate can occur when sulfuric acid is used to regenerate a layered bed of strong and weak acid cation resins.

OBJECTIVES OF THE INVENTION

Accordingly, it is an object of this invention to provide improved methods of regenerating ion exchange particles by upward or countercurrent regenerant flow.

Another object is to reduce the amount of waste liquid that must be disposed of as a result of upflow ion exchange regeneration.

Another object is to fully utilize a regenerant solution.

Another object is to regenerate the ion exchange particles at the top of a compacted resin bed that is being regenerated by upwardly flowing regenerant solution.

Another object is to regenerate the weak resin particles in a stratified ion exchange bed with regenerant solution that has already been used to regenerate the strong acid resin particles in the bed.

Another object is to prevent upset or expansion of a compacted ion exchange bed during upflow regeneration without using air pressure and without wasting large volumes of water.

Another object is to prevent calcium sulfate precipitation in weak cation resin that is being regenerated with recycled sulfuric acid solution.

Another object is to provide efficient, adjustable, relatively low cost methods for upflow regeneration of ion exchange particles that employ simple, easily controlled mechanical devices, and that do not have defects found in prior upflow regeneration procedures or apparatus.

Another object is to fully utilize the exchange media in an ion exchange installation.

Other objects and advantages of the invention will be found in the specification and claims, and the scope of the invention will be set forth in the claims.

DESCRIPTION OF THE DRAWING

The drawing shows a schematic, partially cross sectional view of an ion exchange installation in accord with this invention.

DESCRIPTION OF PREFERRED EMBODIMENTS

In the drawing a pressure vessel 10 contains a compact, stratified bed 11 of ion exchange resin particles. A predominant volume of bed 11 is made from a thick body of a first resin 12 that occupies the lower part of vessel 10. A minor part of bed 11 is made from a thin layer of particles 13 of a second resin deposited on top of the thick body of first resin particles. For example, the thick body of resin 12 may have a volume about ten times greater than the volume of the thin layer of resin 13. A conventional grid 14 of header and perforated lateral pipes, including strainers, for collecting regenerant solution and rinse water essentially spans the interior of vessel 10 at the interface 15 between thin layer of second particles 13 and thick body of first particles 12. Pressurized liquid to be treated by bed 11 flows from an untreated liquid line 16 through an inlet control valve 17 into the top of vessel 10. The liquid continues to flow downwardly through bed 11 where unwanted ions are removed, and the treated liquid exists through bottom line 18 and outlet control valve 19, and then flows through a treated liquid outlet line 20 to its intended use. Conventional liquid distributor and collector grids made from perforated header and lateral pipes may be employed at the top and bottom of vessel 10. During the liquid treatment operation, bed 11 is fully compacted by the downward flow, and the space in the upper portion 21 of vessel 10 is unoccupied by ion exchange particles.

When the ion removing capacity of the resins in bed 11 diminishes to some predetermined level, the bed is regenerated. Valves 17 and 19 are closed. Valves 22 and 23 are opened and pump 24 is started. This forces water through regenerant recirculation line 25 and into regenerant recirculation distributor grid 26 made from header and perforated lateral pipes including strainers. Distributor grid 26 essentially spans the interior of vessel 10 a slight distance above the uppermost surface of bed 11 when the bed is compacted. The recirculated water flows downwardly out of distributor grid 26 and through the thin layer of second resin 13 and into collector grid 14. This sets up a recirculation flow from grid 26, which should be around one half of the regenerant solution flow rate or higher in order to provide sufficient force to prevent upward expansion of bed 11 after the flow of regenerant chemicals reaches its peak. After recirculation flow from grid 26 into collector 14 has taken effect, regenerant flow begins. Valve 27 is opened and regenerant dilution water from a pressurized line 28 flows slowly into vessel 10 through line 18; this introduces regenerant flow in the reverse direction to the service flow through bed 11. Regenerant outlet valve 29 is opened simultaneously with valve 27 thus opening waste drain line 30. This causes the dilution water to enter collector grid 14 and to leave bed 11 without flowing upwardly into the thin layer of second resin 13 or into space 21. The dilution water joins and mixes with the recirculation flow in grid 26 and the combined flows leave the vessel through line 31. These flows then divide with one portion equal to the dilution water flow passing through valve 29 to waste through line 30. A second portion equal to the recirculation flow passes through valve 22, pump 24 and valve 23 into line 25, through grid 26 and down through resin 13 to enter collection grid 14. Valve 33 is then opened and concentrated regenerant chemical solution (e.g. sulfuric acid) from a regenerant supply line 34 flows into and mixes with the stream of dilution water flowing through bottom line 18. The resulting regenerant solution flows upwardly at a rate of from about one to ten gallons per minute per square foot of bed cross section from the bottom of bed 11 through thick body of resin 12 to the interface 15 and then into collector grid 14. The concentrated regenerant chemicals from line 34 increase the density of the liquid flowing upwardly through bed 11. However, the downward flow of recycled liquid through thin layer of resin 13 blocks upward bed expansion. This keeps bed 11 fully compacted during the entire regeneration cycle. The particles of first resin 12 at the bottom of bed 11 are contacted by full strength regenerant solution and thus are regenerated to their highest capacity. The upwardly flowing solution regenerates the rest of the particles of first resin 12 and enters collector 14 containing excess regenerant chemical that has not been consumed by the first resin 12.

From collector 14, the spent or partially spent regenerant solution flows through valve 29 into drain line 30. However, valves 22 and 23 are kept open and pump 24 is kept running during the regeneration cycle so that some of the regenerant solution is recycled through line 25 into distributor grid 26. The recycled or returned regenerant solution flows downwardly from distributor 26 through thin layer of second resin 13 and into collector 14. During the part of the regeneration cycle when the returned regenerant solution from distributor 26 has not been completely spent regenerating the thick body of first resin 12, the solution can regenerate the thin layer of second resin 13. However, even if the recycled regenerant solution from distributor 26 does not accomplish any significant regeneration of the thin layer of resin 13, the rate at which the regenerant solution flows into the top of bed 11 will be sufficient to provide a force that prevents upward expansion of bed 11 during the upflow regeneration cycle. Another line 35 controlled by a valve 36 may be used to provide a flow of additional dilution water or additional regenerant solution, if needed to properly regenerate the thin layer of resin 13. After the regenerant solution has flowed for some predetermined time upwardly through thick body of resin 12 and been recycled downwardly through thin layer of resin 13, the regeneration cycle will be terminated by closing valve 33 and stopping flow of concentrated regenerant through line 34. The dilution water from line 28 will continue to flow and valves 22, 23, 28 and 29 will be kept open until the regenerant chemicals have been rinsed from bed 10. Then valves 22, 23, 27 and 29 are closed and pump 24 is stopped. Valves 17 and 37 can then be opened to provide a downflow rinse of bed 11 that exits through drain line 38. After downflow rinsing, valve 37 is closed, and valve 19 is opened and the liquid treatment cycle is started again. After several regeneration cycles as described above, it may be desirable to backwash bed 11 by flowing water upwardly from line 18 with sufficient force to expand the bed into space 21. The bed can be compacted again by flowing water downwardly rapidly from line 16 through vessel 10 and out through line 18 and outlet 20. Pump 24 may have a variable output so that recirculation flow through line 25 can be adjusted if operating conditions change.

The thick body of first resin 12 may be a strong acid or a strong base resin and the thin layer of second resin 13 may be a weak acid or a weak base resin of the same type as the first resin. The strong and weak resins can be either anion or cation resins. The weak resin will remain on top of bed 11 as a thin layer 13 after the bed has been expanded during a backwashing cycle because weak resins are less dense than their corresponding strong resins. It is also possible for the thin layer of weak resin to be regenerated by regenerant solution that has been sufficiently used up by passage through thick body of resin 12 that it is no longer effective for regenerating a strong resin.

The invention has additional advantages when used with sulfuric acid and a stratified bed of cation resins. In service, the water being treated first passes through the upper layer 13 of weak acid cation resin which removes only the carbonate hardness. This weak cation resin can be regenerated at a very high acid efficiency even at very low acid concentrations. The remaining cations are removed very completely by the thick body 12 of strong acid cation resin but at a lower efficiency. Counter current regeneration with sulfuric acid is particularly efficient with a layered bed of cation resins because the waste acid from the strong cation resin is often more than enough to regenerate the weak cation resin.

With any sulfuric acid regeneration of cation resin, unless the percentage of calcium of the total cations is very low, it is necessary to limit the acid strength used in order to prevent the precipitation of calcium sulfate onto the resin. Since the weak cation resin in a stratified bed removes only carbonate hardness, the percent of calcium on the weak cation resin will be very high. For this reason, the acid strength for the weak cation resin should be limited to 0.8% by weight or less, while the strong cation resin should be regenerated with acid solutions of about 1.2% or more by weight of sulfuric acid to achieve optimum efficiency. Thus, concentrated sulfuric acid from line 34 would be diluted to about 1.2% by dilution water from line 23, and used sulfuric acid regenerant solution being recycled by pump 24 could be diluted to below 0.8% when necessary by dilution water from line 35 before the recycled regenerant solution enters distributor 26. This permits a single source of sulfuric acid solution to be used to regenerate both the strong and weak resins, yet ensures that calcium sulfate precipitates will not foul bed 11.

It has thus been shown that by the practice of this invention a compacted bed of ion exchange resin can be regenerated by upward flow without destroying the bed's compactness, even though flow of blocking air, or supplemental liquid flow are not used. This is accomplished by withdrawing completely or partially used regenerant solution from just below the top of the bed and recycling such withdrawn solution through a thin layer of resin particles at the top of the bed that are not contacted by the solution before it is withdrawn. Thus the volume of waste liquid resulting from regeneration is not increased. The regenerating capacity of the recycled regenerant solution can be used to regenerate the thin layer of resin particles at the top of the bed thereby increasing the ion removal capacity of the bed without increasing the amount of regenerant chemicals required. And, strong and weak cation resins can be regenerated efficiently with sulfuric acid without causing calcium sulfate precipitation.

In some embodiments of the invention, the relative proportions of bed 11 made from first and second resins 12 and 13 may be reversed such that the predominant volume of the bed would be second resin 13. Grid 14 would still be located at the interface 15 between the two resins, regardless of their relative proportions. Also, it is contemplated that only one type of resin may be used, as for example in a sodium cycle cation water softener, in which case grid 14 would be placed at a location where recycled regenerant solution flowing downwardly from grid 36 could effectively regenerate the upper layer 13 of such resin.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention described herein. It is intended that the appended claims cover all such changes as fall within the true spirit and scope of the invention.

What is claimed is:

1. A method of upflow regeneration of a spent stratified bed of ion exchange resin particles in which one part of said bed is a body of particles of a first resin occupying the lower part of a vessel and another part of said bed is a body of particles of a second resin deposited on top of said body of first resin particles, said method comprising the steps of:
   A. passing a regenerant solution upwardly through said body of first resin particles;
   B. withdrawing from said vessel the regenerant solution that has passed through said first resin particles essentially at the interface between said first and second resins before such regenerant solution can pass upwardly through said second resin particles;
   C. recycling at least some of such withdrawn regenerant solution to said vessel above said second resin particles;
   D. passing such recycled regenerant solution downwardly through said second resin particles with sufficient force to prevent upward expansion of said bed; and
   E. withdrawing said recycled regenerant solution from said vessel essentially at said interface before it can pass into said body of first resin particles.

2. The invention defined in claim 1, wherein said first and second resins are of the same type.

3. The invention defined in claim 2, wherein said first resin is a strong resin and said second resin is a weak resin.

4. The invention defined in claim 3 wherein said strong and weak resins are cation resins.

5. The invention defined in claim 3, wherein said strong and weak resins are anion resins.

6. The invention defined in claim 1, wherein a predominant volume of said bed is a thick body of said first resin particles and a minor part of said bed is a thin layer of said second resin particles.

7. The method defined in claim 1 wherein said recycled regenerant solution is passed downwardly in step D at a rate of at least about one half of the rate at which said regenerant solution is passed upwardly in step A.

8. A method of upflow regeneration of a stratified bed of ion exchange resin particles in which a predominant volume of said bed is a thick body of strong resin particles occupying the lower part of a vessel and a minor part of said bed is a weak resin of the same type as said strong resin deposited as a thin layer of particles on top of said thick body of first resin particles, there being an unoccupied space in said vessel above said bed, said method comprising the steps of:
   A. passing a regenerant solution upwardly through said thick body of strong resin particles from its bottom to its top;
   B. withdrawing from said vessel the regenerant solution that has passed through said strong resin essentially at the interface between said strong and weak resins before such regenerant solution can pass upwardly through said thin layer of weak resin particles;
   C. returning some of such withdrawn regenerant solution to said vessel above said thin layer of weak resin particles;
   D. pumping such returned regenerant solution downwardly through said thin layer of weak resin particles with sufficient force to prevent upward expansion of said bed; and
   E. withdrawing said returned regenerant solution from said vessel essentially at said interface before it can pass into said thick body of strong resin particles.

9. A method of preventing calcium sulfate precipitation when using recycled regenerant solution during the upflow regeneration of a spent stratified bed of cation exchange resin particles in which a predominant volume of said bed is a thick body of strong cation resin particles occupying the lower part of a vessel and a minor part of said bed is a weak cation resin deposited as a thin layer of particles on top of said thick body of strong cation resin particles, there being an unoccupied space in said vessel above said bed, said method comprising the steps of:
   A. withdrawing water from said vessel before it can pass upwardly through said thin layer of weak cation particles;
   B. returning some of such withdrawn water to said vessel above said thin layer of weak cation particles;
   C. passing such returned water downwardly through said thin layer of weak cation particles;
   D. withdrawing said returned water from said vessel before it can pass into said thick body of strong cation particles;
   E. passing regenerant dilution water upwardly through said thick body of strong cation particles from its bottom to its top;
   F. withdrawing said regenerant dilution water from said vessel with said returned water;

G. flowing concentrated sulfuric acid into said regenerant dilution water and then passing the resulting regenerant solution upwardly through said thick body of strong cation particles;

H. withdrawing from said vessel the regenerant solution that has passed through said strong cation particles before such regenerant solution can pass upwardly through said thin layer of weak cation particles;

I. recycling some of such withdrawn regenerant solution into said vessel above said thin layer of weak cation particles;

J. passing such recycled regenerant solution downwardly through said thin layer of weak cation particles with sufficient force to prevent upward expansion of said bed; and K. withdrawing said recycled regenerant solution from said vessel before it can pass into said thick body of strong cation particles.

10. The invention defined in claim 9, further comprising the step of flowing additional water into said recycled regenerant solution so as to dilute said recycled regenerant solution before it is passed downwardly through said thin layer of weak cation particles.

11. The invention defined in claim 9, wherein said regenerant solution is at least about 1.2% by weight sulfuric acid and said recycled regenerant solution is diluted to below about 0.8% by weight sulfuric acid.

* * * * *